US007196918B2

(12) United States Patent
Steffen et al.

(10) Patent No.: US 7,196,918 B2
(45) Date of Patent: Mar. 27, 2007

(54) CAPACITIVE DROP POWER SUPPLY WITH LOW POWER CONSUMPTION

(75) Inventors: Mike A. Steffen, Rockford, IL (US); Gregory A. Peterson, South Barrington, IL (US); Jurgis Astrauskas, Saint Charles, IL (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/936,002

(22) Filed: Sep. 8, 2004

(65) Prior Publication Data

US 2006/0050540 A1 Mar. 9, 2006

(51) Int. Cl.
*H02M 7/10* (2006.01)

(52) U.S. Cl. .......................... 363/49; 363/52; 363/908

(58) Field of Classification Search ................. 363/49, 363/52, 125, 126, 908, 901
See application file for complete search history.

(56) References Cited

U.S. PATENT DOCUMENTS 4,544,876 A * 10/1985 Bailey et al. ............... 323/282
5,341,085 A 8/1994 Ettes
5,701,071 A 12/1997 Liou et al.
5,721,675 A * 2/1998 Lee ............................ 363/44
5,838,555 A * 11/1998 Lejeune et al. ............... 363/49
6,014,325 A * 1/2000 Pecore ....................... 363/126
6,023,419 A * 2/2000 Yang .......................... 363/86
6,316,844 B1 11/2001 Arima
6,377,031 B1 4/2002 Karuppana et al.
6,421,430 B1 * 7/2002 Hollenbach et al. ..... 379/93.36
6,657,405 B2 12/2003 Yang

* cited by examiner

*Primary Examiner*—Bao Q. Vu
(74) *Attorney, Agent, or Firm*—Harness, Dickey & Pierce, PLC

(57) ABSTRACT

An improved capacitive drop power supply is provided for use in home appliances. The power supply circuit includes: a rectifier for converting an AC power source to a DC voltage; a current limiting capacitance interposed between the AC power source and the rectifier; a low voltage output stage and a higher voltage output stage. The low voltage output stage supplies DC voltage from the rectifier to a microcontroller residing in the home appliance. The higher voltage output stage is connected in series with the low voltage stage and supplies DC voltage to the higher voltage loads associated with the home appliance. To reduce power consumption, a shunt circuit path is connected in parallel across the higher voltage output stage which causes a phase shift in the AC power signal and thereby reduce real power consumption when a no load condition is placed on the output stage (e.g., during a standby operating condition of the home appliance).

18 Claims, 2 Drawing Sheets

CAPACITIVE DROP POWER SUPPLY WITH LOW POWER CONSUMPTION

FIELD OF THE INVENTION

The present invention relates to a capacitive drop power supply for use in home appliances and more particularly, to a technique for reducing power consumption of the power supply circuit during a standby operating condition of the appliances.

BACKGROUND OF THE INVENTION

Capacitive drop power supplies offer an inexpensive circuit design for supplying power to home appliances. One disadvantage of this circuit design is that to deliver more power to its load, the supply circuit must employ a larger input capacitor which in turn requires larger regulating resistive elements. As a result, when power is dissipated back through the circuit under no load conditions, the supply circuit consumes considerable power. In the past, such power consumption was of no concern. However, recent government regulations, such as Energy Star, impose low power consumption requirements on many home appliances. Therefore, it is desirable to provide a low cost power supply circuit design which meets these recent low power consumption standards.

SUMMARY OF THE INVENTION

In accordance with the present invention, an improved capacitive drop power supply is provided for use in home appliances. The power supply circuit includes: a rectifier for converting an AC power source to a DC voltage; a current limiting capacitance interposed between the AC power source and the rectifier; a regulated low voltage output stage and a regulated higher voltage output stage. The low voltage output stage supplies DC voltage from the rectifier to the low voltage loads (e.g., a microcontroller) associated with the home appliance. The higher voltage output stage is connected in series with the low voltage stage and supplies DC voltage to the higher voltage loads associated with the home appliance. To reduce power consumption, a shunt circuit path is connected in parallel across the higher voltage output stage which causes a phase shift in the AC power signal and thereby reducing real power consumption when a no load condition is placed on the output stage (e.g., during a standby operating condition of the home appliance).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Figure 1:
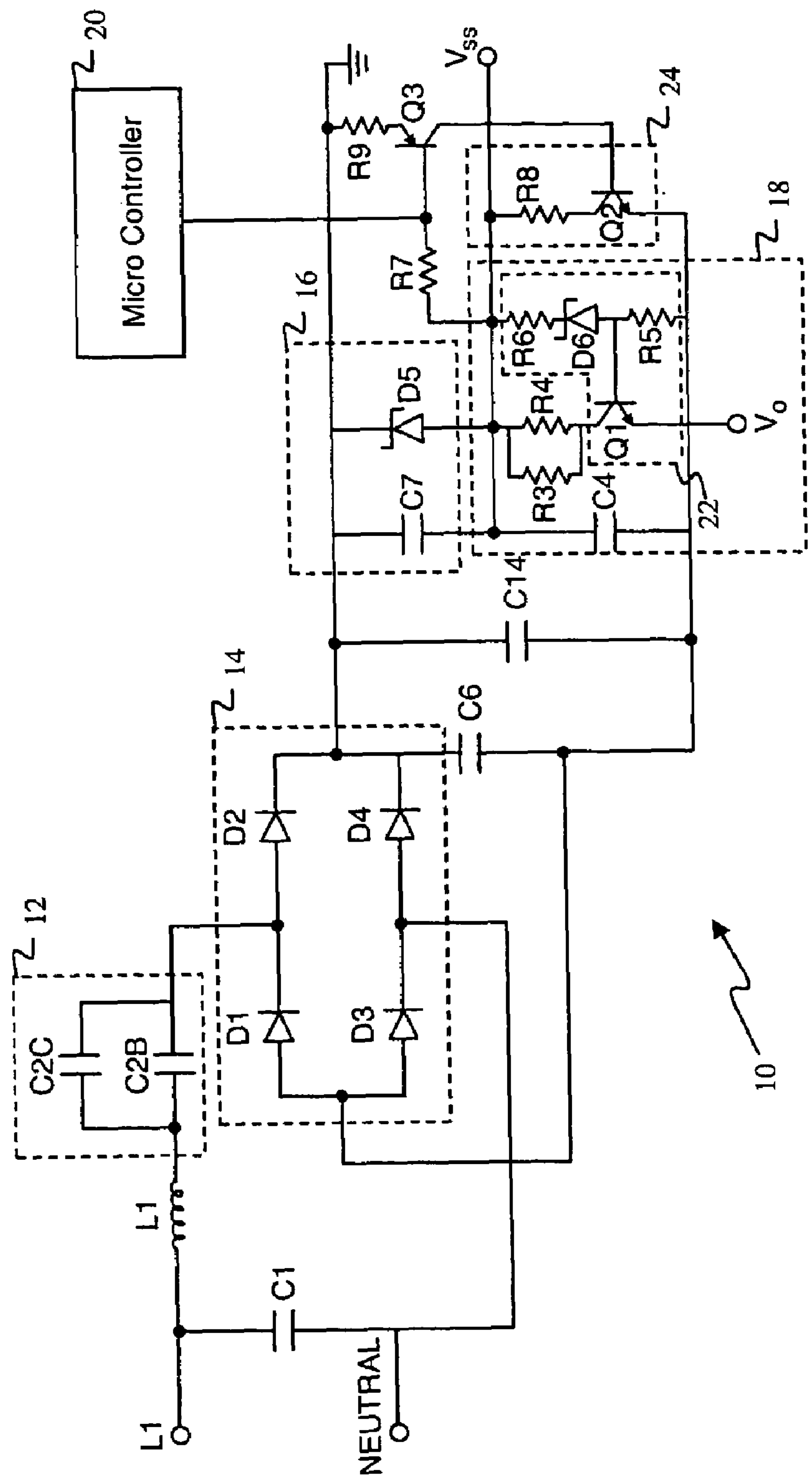
FIG. 1 is a schematic of an exemplary capacitive drop power supply circuit in accordance with the present invention.

FIG. 1 depicts an exemplary capacitive drop power supply circuit 10 in accordance with the present invention. The power supply circuit 10 is generally comprised of an input capacitance 12, a rectifier 14, a low voltage output stage 16 and a higher voltage output stage 18. In this example, the power supply circuit 10 resides in an oven. However, it is readily understood that such a power supply circuit may be used in other home appliances as well as other types of consumer electronic products.

The rectifier 14 electrically couples to an AC power source. In operation, the rectifier 14 converts the power signal from the AC source to a DC voltage as is well known in the art. In the exemplary embodiment, the rectifier 14 is in the form of a bridge rectifier circuit; however, other types of rectifiers are also within the scope of the present invention. To reduce DC voltage ripple, a high frequency filter capacitor C6 and a low frequency filter capacitor C14 are preferably connected across the output terminals of the rectifier.

Interposed between an AC power source and the rectifier 14 is the input capacitance 12 which operates to limit the current output by the supply circuit 10. Although the input capacitance 12 is shown in the form of two capacitors C2B, C2C placed in parallel, it is likewise envisioned that other circuit configurations for the input capacitance are also within the scope of the present invention.

DC voltage from the rectifier is in turn output through either of two output terminals. The low voltage output stage 16 provides an output terminal Vss for connection to low voltage loads (i.e., −5 volts); whereas, the higher voltage output stage 18 provides an output terminal $V_0$ for connection to higher voltage loads (e.g., 24–30 volts). Each of these output stages is further described below.

The low voltage output stage 16 supplies DC voltage from the rectifier to its output terminal. In the exemplary embodiment, the low voltage output stage is comprised of a capacitor C7 connected in parallel with a voltage regulating Zener diode D5. In addition, the output terminal for the low voltage output stage 16 is connected to the power supply inputs of a microcontroller 20. It is readily understood that other types of low voltage loads may be coupled to the output stage 16.

The higher voltage output stage 18 is then connected in series with the low voltage output stage 16. In particular, a capacitor C4 is connected in series with capacitor C7 between the output terminal of the low voltage output stage 16 and the output terminal of the higher voltage output 18. Resistors R3 and R4 are also placed in parallel with the capacitor C4. To regulate output voltage, the higher voltage output stage 18 may include a voltage regulating circuit 22.

Lastly, a shunting circuit path 24 is connected in parallel across the higher voltage output stage. The shunting circuit path 24 is generally comprised of a resistive element and a switching element that reduces real power consumption when the switching element is turned on. To do so, the shunting circuit path 24 causes a phase shift in AC power signal input to the power supply circuit when a no load condition is placed on the output stage 18, thereby reducing real power consumption of the supply circuit. In the exemplary embodiment, a resistor R8 is connected in series with a bipolar transistor Q2 as shown in FIG. 1. However, it is readily understood that other circuit configurations for the shunting circuit path are also within the broader aspects of the present invention.

Figure 2:
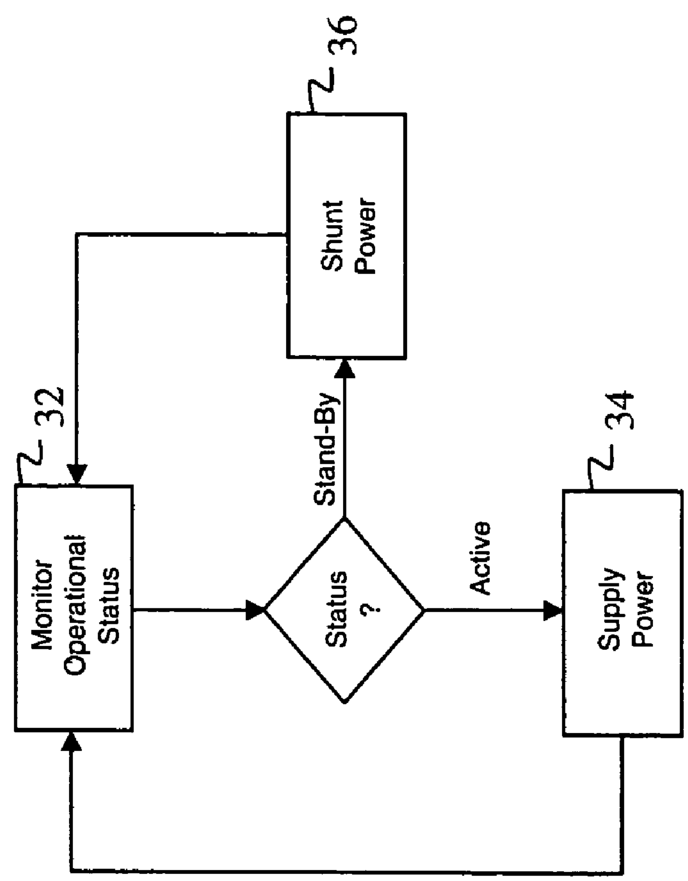
FIG. 2 is a flow chart illustrating a method for reducing power consumption in a home appliance using the power supply circuit of the present invention.

Referring to FIG. 2, a method is further described for reducing power consumption in a home appliance using the above described power supply circuit. The microcontroller 20 of a home appliance monitors its operating condition at 32 and outputs control signals indicative of the same. For instance, when the appliance is turned on, an active state signal is output by the microcontroller 20. In an active operating condition, power is supplied from the power supply circuit to various electrical components associated with the appliance as shown at 34.

On the other hand, when the appliance is turned off, a standby state signal is output by the microcontroller 20, thereby indicating that no load is being placed on the higher voltage output stage 18. Shunting of the higher voltage output stage 18 is then regulated at 36 in accordance with the standby control signal received from the microcontroller 20. It is readily understood that the microcontroller 20 is continually monitoring the operation of the appliance, and consequently placing a constant load on the low voltage output stage of the power supply circuit 10.

To regulate shunting, a second switching transistor Q3 is interposed between the microcontroller 20 and the shunting circuit path 24, such that a base of the second transistor Q3 is directly connected to the output port of the microcontroller 20 and a collector of the second transistor Q3 is connected to the base of the transistor Q1 in the shunting circuit path 24. In response to a standby control signal, the second transistor Q3 is turned on which in turn turns on the transistor Q2 of the shunting circuit path. Rather than dissipating power across the relatively high resistive elements R3 and R4, power is dissipated across a much lower resistive element R8 of the shunting circuit path 24. Moreover, a phase shift occurs in the AC power signal input into the supply circuit. In this way, real power consumption of the capacitive drop power supply circuit is considerably reduced during a standby operating condition, thereby enabling the home appliance to meet recent government regulations.

While the exemplary embodiment of power supply circuit has been described above with specific components having specific values and arranged in a specific configuration, it will be appreciated that this circuit may be constructed with many different configurations, components, and/or values as necessary or desired for a particular application. The above configurations, components and values are presented only to describe one particular embodiment that has proven effective and should be viewed as illustrating, rather than limiting, the present invention. Thus, the description of the invention is merely exemplary in nature and, thus, variations that do not depart from the gist of the invention are intended to be within the scope of the invention. Such variations are not to be regarded as a departure from the spirit and scope of the invention.

What is claimed is:

1. A capacitive drop power supply circuit for use in a home appliance, comprising:

a rectifier electrically connected to an AC power source and operable to convert an AC power signal to a DC voltage;

a current limiting capacitance interposed between the AC power source and the rectifier;

a low voltage output stage having an output terminal for connection to a low voltage load, the low voltage output stage receiving the DC voltage from the rectifier and operable to output the DC voltage at the output terminal;

a higher voltage output stage having an output terminal for connection to a higher voltage load, the higher voltage output stage connected in series with the low voltage stage and operable to output the DC voltage at the output terminal; and a shunt circuit path connected in parallel across the higher voltage output stage and comprising a first switching circuit that turns ON based on a standby control signal provided to a second switching circuit that regulates the shunt circuit path, the second switching circuit connecting to the first switching circuit, wherein the shunt circuit path operates to reduce real power consumption when a NO LOAD condition is placed on the higher voltage output stage.

2. The capacitive drop power supply circuit of claim 1 wherein the shunt circuit path is operable to phase shift the AC power signal, thereby reducing real power consumption of power supply circuit.

3. The capacitive drop power supply circuit of claim 1 wherein the shunt circuit path comprises a resistive element connected in series with a switching element, such that power is dissipated across the resistive element when the switching element is turned ON.

4. The capacitive drop power supply circuit of claim 3 further comprising a microcontroller configured to receive DC power from the low voltage output stage, the microcontroller being operable to monitor operating conditions of the home appliance and output a control signal to the switching element of the shunt circuit path.

5. The capacitive drop power supply circuit of claim 3 wherein the rectifier comprises a bridge rectifier circuit.

6. The capacitive drop power supply circuit of claim 3 wherein the low voltage output stage comprises a capacitor connected in parallel with a Zener diode.

7. The capacitive drop power supply circuit of claim 3 wherein the high voltage output stage comprises a capacitor connected in parallel with a voltage regulating circuit.

8. A capacitive drop power supply circuit having low power consumption during a standby operating condition of a home appliance, comprising:

a rectifier connected to an AC power source and operable to convert an AC power signal to a DC voltage;

a current limiting capacitance interposed between the AC power source and the rectifier;

a low voltage output stage having an input connected to the rectifier and an output connected to a microcontroller, the low voltage output stage operable to supply the DC voltage from the rectifier to the microcontroller and the microcontroller operable to monitor an operating condition of the home appliance;

a higher voltage output stage connected in series with the low voltage stage and having an output terminal for connection to a higher voltage load, the higher voltage output stage operable to supply the DC voltage to the output terminal; and a shunt circuit path connected in parallel across the higher voltage output stage and configured to receive a control signal from the microcontroller, the control signal indicative of the operating condition of the home appliance and the shunt circuit path, the shunt circuit path comprising a first switching transistor that turns ON based on the control signal provided to a second switching circuit that regulates the shunt circuit path, a collector of the second switching circuit connecting to a base of the first switching circuit, the shunt circuit path operating to reduce real power consumption during a standby operating condition of the home appliance.

9. The capacitive drop power supply circuit of claim 8 wherein the shunt circuit path is operable to phase shift the AC power signal, thereby reducing real power consumption of power supply circuit.

10. The capacitive drop power supply circuit of claim 8 wherein the shunt circuit path comprises a resistor connected in series with a transistor, such that power is dissipated across the resistor when the transistor is turned ON.

11. The capacitive drop power supply circuit of claim 10 wherein an emitter of the transistor is coupled to the output terminal of the higher voltage output stage and the resistor is coupled between the low voltage output stage and a collector of the transistor.

12. The capacitive drop power supply circuit of claim 10 wherein a base of the transistor is connected to an output port of the microcontroller, such that the transistor is turned ON and OFF in accordance with the control signal received from the output port of the microcontroller.

13. The capacitive drop power supply circuit of claim 12 further comprising a second transistor interposed between the transistor and the microcontroller, where a base of the second transistor is directly connected to the output port of the microcontroller and a collector of the second transistor is directly connected to the base of the transistor.

14. The capacitive drop power supply circuit of claim 10 wherein the rectifier comprises a bridge rectifier circuit.

15. The capacitive drop power supply circuit of claim 10 wherein the low voltage output stage comprises a capacitor connected in parallel with a Zener diode.

16. The capacitive drop power supply circuit of claim 10 wherein the high voltage output stage comprises a capacitor connected in parallel with a voltage regulating circuit.

17. A capacitive drop power supply circuit for use in a home appliance, comprising:

a rectifier electrically connected to an AC power source and operable to convert an AC power signal to a DC voltage;

a current limiting capacitance interposed between the AC power source and the rectifier;

a low voltage output stage having an output terminal for connection to a low voltage load, the low voltage output stage receiving the DC voltage from the rectifier and operable to output the DC voltage at the output terminal;

a higher voltage output stage having an output terminal for connection to a higher voltage load, the higher voltage output stage connected in series with the low voltage stage and operable to output the DC voltage at the output terminal; and means for supplying a control signal to a first switching circuit that regulates phase shifting of the AC power signal, thereby reducing the real power consumption of the power supply circuit.

18. The capacitive drop power supply circuit of claim 17 wherein the means for phase shifting comprises a shunt circuit path connected in parallel across the higher voltage output stage, the shunt circuit path comprising a resistor connected in series with a transistor.

* * * * *